April 22, 1952  J. B. KELLEY, JR  2,593,569
FRAME STRUCTURE FOR HAY BALERS
Filed Feb. 15, 1949  8 Sheets-Sheet 1

INVENTOR.
JAMES B. KELLEY, JR.
BY
McMorrow, Berman & Davidson
ATTORNEYS.

April 22, 1952  J. B. KELLEY, JR  2,593,569
FRAME STRUCTURE FOR HAY BALERS
Filed Feb. 15, 1949  8 Sheets-Sheet 2

FIG. 2.

INVENTOR.
JAMES B. KELLEY, JR.
BY
McMorrow, Berman + Davidson
ATTORNEYS.

April 22, 1952  J. B. KELLEY, JR  2,593,569
FRAME STRUCTURE FOR HAY BALERS
Filed Feb. 15, 1949  8 Sheets-Sheet 3

INVENTOR.
JAMES B. KELLEY, JR.
BY
McMorrow, Berman + Davidson
ATTORNEYS.

April 22, 1952 — J. B. KELLEY, JR — 2,593,569
FRAME STRUCTURE FOR HAY BALERS
Filed Feb. 15, 1949 — 8 Sheets-Sheet 5

INVENTOR.
JAMES B. KELLEY, JR.
BY
McMorrow, Berman & Davidson
ATTORNEYS.

April 22, 1952   J. B. KELLEY, JR   2,593,569
FRAME STRUCTURE FOR HAY BALERS
Filed Feb. 15, 1949   8 Sheets-Sheet 6

INVENTOR.
JAMES B. KELLEY, JR.
BY
McMorrow, Berman + Davidson
ATTORNEYS.

INVENTOR.
JAMES B. KELLEY, JR.
BY
McMorrow, Berman + Davidson
ATTORNEYS.

April 22, 1952    J. B. KELLEY, JR    2,593,569
FRAME STRUCTURE FOR HAY BALERS
Filed Feb. 15, 1949    8 Sheets-Sheet 8

INVENTOR.
JAMES B. KELLEY, JR.
BY
McMorrow, Berman + Davidson
ATTORNEYS.

Patented Apr. 22, 1952

2,593,569

UNITED STATES PATENT OFFICE 2,593,569

FRAME STRUCTURE FOR HAY BALERS

James B. Kelley, Jr., San Antonio, Tex., assignor, by direct and mesne assignments, of one-third to Harold Gurinsky, and nine-thirtieths to C. M. Kelley, both of San Antonio, Tex., and one-thirtieth to Floyd McGown and Floyd McGown, Jr., jointly Application February 15, 1949, Serial No. 76,623

4 Claims. (Cl. 100—19)

This invention relates to hay baling machines, and more particularly to a hydraulic hay baler.

It is an object of this invention to provide a hay baler of the kind to be more particularly described hereinafter having a hydraulic ram reciprocable in the baler frame and actuated by controlled devices which may be selectively adjusted, at the will of the operator.

In balers presently on the market, the power is transmitted from the engine to the ram by a series of gears. It is an object of this invention to provide a device in which the power is transmitted from the engine to the reciprocating ram by hydraulic pressure.

Still another object of this invention is to provide a hydraulic baler of this kind which is lighter in weight and more economical to manufacture and hence less expensive to the consumer, compared to the balers presently on the market.

A further object of this invention is to provide a baler of this kind which is economical to operate as this baler requires only one-fourth to one-third of the power required by the gear type balers.

Still a further object of this invention is to provide a hydraulic baler of this kind which is efficient and fast in operation, and longer wearing due to the decrease in friction bearing parts, and is safer to operate due to the absence of gears.

Still another object of this invention is to provide a hydraulic baler of this kind in which the size and weight of the bales produced may be selectively controlled by the operator, and the bales produced from the baler will be uniform as to size.

Another object of this invention is to provide a pressure fluid operated device as a source of power for operating a reciprocatory element or device, and in which novel means are embodied for controlling the effective action of the pressure fluid to impart reciprocatory motion to said element or device.

From the following specification and drawings, it will be clearly noted that the reversing device, herein employed as a valve reversing gear, may readily be adapted to various other types of reciprocating, power driven elements and devices, without departing from the spirit of the invention herein disclosed.

With the above and other objects in view, my invention consists in the arrangement, combination and details of construction disclosed in the drawings and specification, and then more particularly pointed out in the appended claims.

Referring to the drawings, the numeral 25 designates generally a hydraulic baler constructed according to an embodiment of my invention.

The baler 25 is formed of a base frame 26 having supporting wheels mounted on a wheel frame 27 at the rear end thereof, and a steering bolster 28 at the forward end thereof.

The baler 25 is adapted to support a straw or hay pickup mechanism 29 on one side thereof, the pickup being actuated by the power means for the baler. The pickup 29 may be formed in any conventional manner, and is preferably formed of one of the several types of pickup mechanisms presently on the market.

A bale forming chamber 30 is formed on the rear end of the frame 26, and includes an upper frame 31 and a bottom wall 32. The upper frame 31 and lower frame or bottom 32 of the bale forming chamber 30 are formed as an extension of the baler frame 26, the bottom 32 being pivotally connected to the rear end of the frame 26 by a pivot pin 34, extending transversely thereof. The bottom 32 is adapted to swing downwardly about the pivot pin 34 when it is desired to remove a bale of hay formed in the forming chamber. A plate 35 closes the rear end of the forming chamber 30, and is pivotally connected to the frame 31, by a transverse pivot pin 36. The pivot 36 is rockably mounted in a bracket 37, fixed on the panel or rear wall 35, and an abutment or plate 38 is fixed on the rear side of the plate 35, extending upwardly above the pivot pin 36. The forward side edge of the plate 38 which extends above the pivot pin 36, is flat along the vertical edge thereof and extends above the upper frame 31. A latch 39 is fixed on the bottom edge of the panel 35 and is adapted to engage the lower surface of the rear end of the bottom wall 32.

Figure 15:
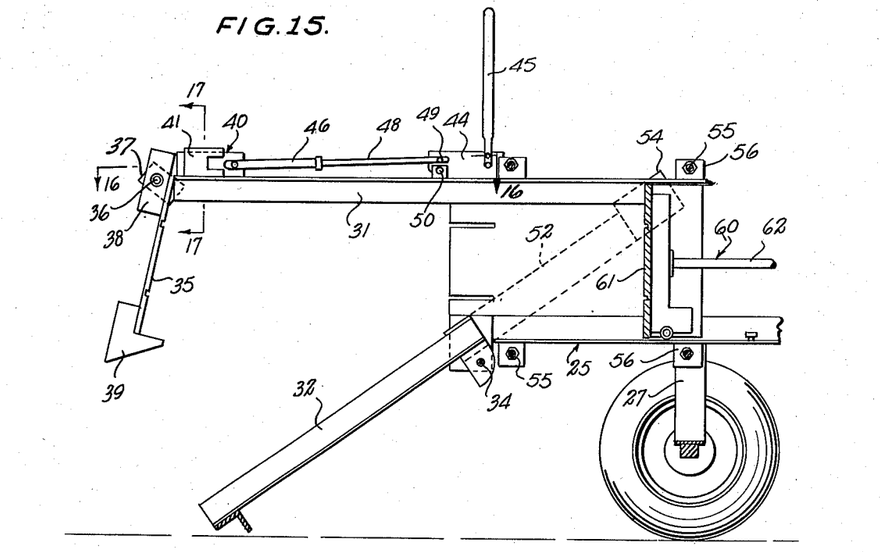
Figure 15 is a longitudinal section, taken on the line 15—15 of Figure 2.
Figures 16, 17:
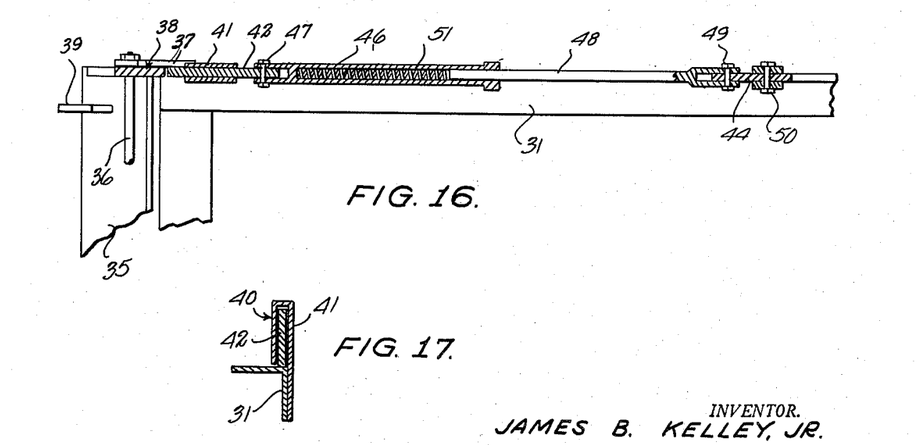
Figure 16 is a longitudinal section, taken on the line 16—16 of Figure 15.
Figure 17 is a fragmentary vertical section taken on the line 17—17 of Figure 15.
Figure 18:
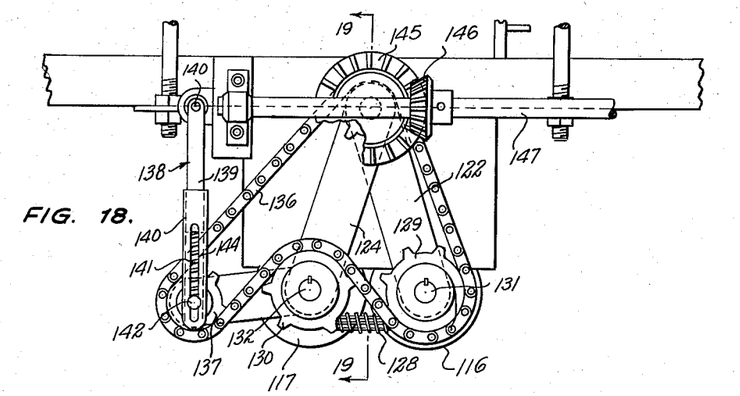
Figure 18 is a top plan view of the rollers and their actuating means.
Figure 19:
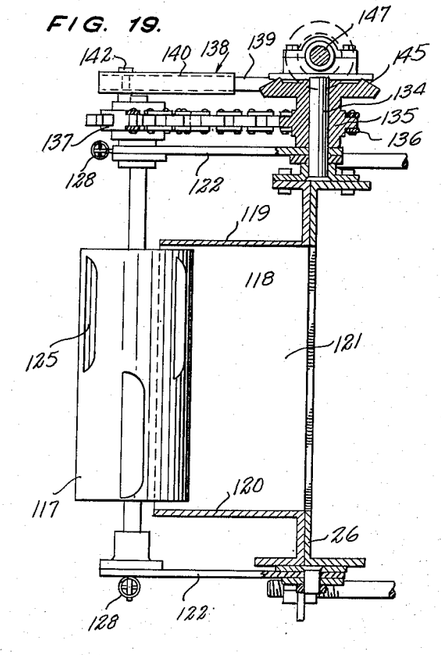
Figure 19 is a fragmentary transverse section taken on the line 19—19 of Figure 18.
Figure 20:
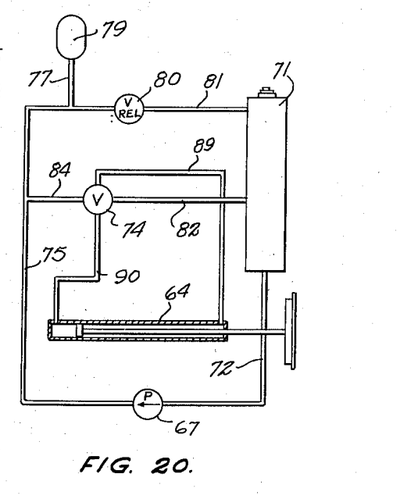
Figure 20 is a diagrammatic showing of the hydraulic flow arrangement.

A locking member 40 is carried by the frame 31 for engagement with the plate 38, to lock the rear wall 35 in latched engagement with the bottom wall 32. A guide member 41 is fixed on one side member of the frame 31 and extends upwardly therefrom. A bolt 42 is slidably engaged through the guide 41 and is formed with a flat rear edge engageable with the flat forward edge of the plate 38, in the locked position of the bolt. A plate or arm 44 is pivoted on the upper surface of the frame 31, forwardly of the guide member 41, or the right as viewed in Figure 15 of the drawings, and a handle 45 is fixed to the arm 44, extending upwardly therefrom in the unlocked position. A tubular member 46 is pivoted on the forward end of the bolt 42 by a pivot pin 47, to the right in Figure 16, and extends forwardly therefrom. A rod 48 is telescopically engaged in the tubular member 46, and extends forwardly, to the right, therefrom. The rod 48 is pivotally connected to the plate or arm 44 by a pivot pin 49. The pivot pin 49 is adapted to be disposed above the pivot pin 50 on which the arm 44 is swingably mounted, in the unlocked position of the arm 44 and the bolt 42. In the locked position of the arm 44 and the bolt 42, the pivot pin 49 will be disposed rearwardly, to the left in Figures 15 and 16, of the pivot pin 50, in the manner shown in Figure 16 of the drawings, for pressing the bolt 42 in engagement with the plate 38, above the pivot 37. A spring 51 is disposed within the tubular member 46, and bears against the rear end of the rod 48, in such a manner that a constant tension is continually exerted on the bolt 42 for urging the bolt to the left into engagement with the plate 38, and therefore urging the keeper 39 into engagement with the rear edge of the bottom 32.

In the operation of the locking device 40, with the handle or arm 45 in the rearwardly extending horizontal position, the spring 51 will be tensioned to such a degree that the plate 35 will be held in its latched position, irrespective of the force imposed on the plate by the reciprocating ram, to be described hereinafter.

A forwardly extending arm 52 is fixed to or formed on the bottom 32, and extends forwardly of the pivot 34. A counter-weight 54 is fixed to, or otherwise mounted, on the arm 52 for counterbalancing the weight of the frame or bottom wall 32. With no weight of baled hay on the bottom wall 32, the weight 54 is sufficient to swing the bottom 32 upwardly into engagement with the latch 39 of the rear wall 35. When a bale is formed on the bottom wall 32, and the lock 40 disengaged from the rear plate 35, the weight of the bale is sufficient to cause the wall 32 to swing about the pivot 34 for slidably removing the bale from the forming chamber.

The longitudinal side members of the frame and the forming chamber are secured together by transverse bolts 55 which are secured through flanges 56, which are fixed to or formed on the side members of the frame and the forming chamber. By securing the side members of the frame and forming chamber together by the bolts 55, the side members may be moved for adjusting the size of the forming chamber.

A hydraulic ram 60 is slidably supported within the frame 25 and the forward end of the forming chamber 30 for compressing the hay or other material in the forming chamber. The ram 60 is formed with a rearwardly facing plate 61, fixed on the rear end of a shaft or piston 62. The piston or shaft 62 is slidably engaged in a cylinder 64 fixed in the forward end of the baler, and supported on transverse frame members 65 therein. A motor 66 is fixed on the forward end of the frame 25 and provides the power for driving the ram 60 and for feeding the material into the forming chamber. A fluid pump 67 is supported on the frame 25, below the motor 66, and is adapted to be driven thereby. A pulley 68 is fixed on the motor shaft and a belt 69 engaging about the pulley 68 also engages about the pulley 70 which is fixed on the shaft. The pulley 70 is fixed on the pump driving shaft.

A fluid supply tank 71 is mounted on one side of the frame 25, and a pipe or tubular member 72 extends from the lower end of the tank 71 to the intake side of the pump 67.

A selector valve 74 is mounted on the frame 25, above the cylinder 64. A pipe or tubular member 75 extends from the outlet side of the pump 67 to the inlet port of the valve 74. The tubular member 75 is connected to the inlet side of selector valve 74 by way of a T-fitting 76. A pipe 77 extends upwardly from the T-fitting 76 on the opposite side of the connection of the pressure line 75. A second T-fitting 78 is fixed on the upper end of the pipe 77, and an accumulator 79 is mounted on the upper open end of the T-fitting 78. A pressure relief or control valve 80 is connected between the T-fitting 78, and the fluid supply tank 71. The pipe 81 which connects the outlet side of the valve 80 with the tank 71 engages the tank at the upper end thereof. A return line 82 is connected between the outlet side of the selector valve 74 and the tank 71, intermediate the vertical height thereof.

The selector valve 74 has a common inlet pipe 84 connected to the T-fitting 76. A common outlet pipe 85 extends from the valve 74, opposite from the inlet opening 84. A rotatable or rockable core 86 is rockably mounted in the casing of the valve 74 and is formed for directing fluid from the inlet opening 84 to a selected outlet opening 87 or 88 on opposite sides of the valve 74, between the inlet and outlet openings therein. One outlet, as 88, is connected to the front end of the cylinder 64, by a pipe 89. The other outlet port of the valve 74 is connected by a pipe 90, to the rear end of the cylinder 64 for retracting the ram when the fluid under pressure is admitted to the rear end of the cylinder. The core 86 is so formed that when the fluid under pressure is being admitted to one end of the cylinder 64, the fluid in the other end of the cylinder 64 is free to pass through the common outlet 85, to be discharged through the pipe 82 into the supply tank 71.

Figures 9, 10:
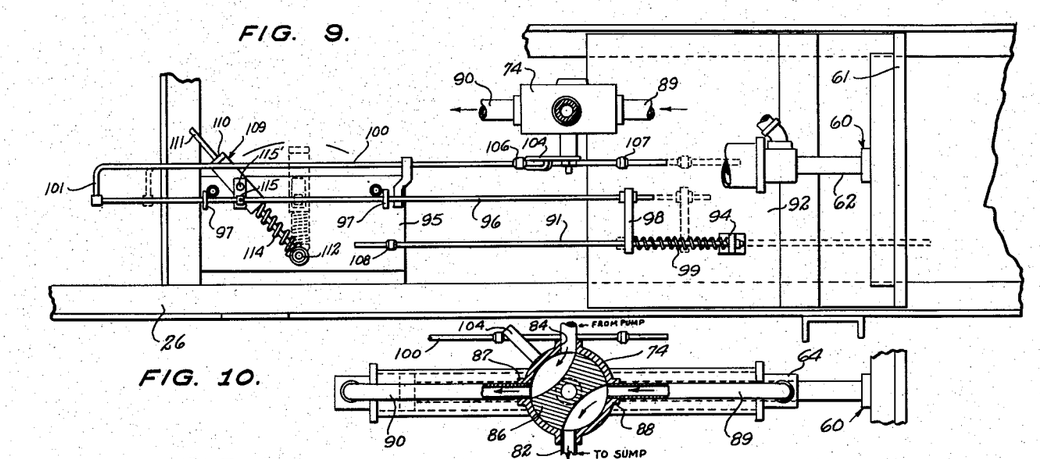
Figure 9 is a longitudinal section taken on the line 9—9 of Figure 2.
Figure 10 is a fragmentary section through the control valve, showing the control valve turned to ram extending position.

The ram 60 is adapted to be reciprocated within the baler 25 and the reciprocation of the ram is effected by the reversing of the valve 74. The valve 74 is adapted to be reversed in timed relation to the movement of the ram 60, and means operatively connected between the ram and the valve are provided for reversing the valve from one position to the other when the ram reaches its extreme end positions, relative to the cylinder 64. The valve control means are clearly shown in Figures 9 and 11 of the drawings, and include a rod 91 fixed to the side plate 92, which is carried by the ram 60 during the reciprocation thereof. The plate 92 forms one side of the ram 60 and extends rearwardly on one side of the front plate 61. The rod or car 91 is secured in a bracket 94, fixed on the side plate 92 and extending inwardly therefrom. A plate 95 is fixed on the frame 26, forwardly of the ram 60 and is adapted to support the valve control rods. A second rod 96 is slidably supported in a pair of aligned bearings 97 which are fixed on the inner side of the plate 95. A depending arm 98 is fixed to or secured on the rear end of the rod 96, and the rod 91 is adapted to be slidably engaged in the free end of the arm 98. A spring 99 is loosely coiled about the rod 91 between the bracket 94 and the arm 98. In the forward movement of the ram 60, the spring 99 is adapted to press the arm 98 forwardly, and the rod 96 will be moved forwardly in the bearings 97. A third rod 100 is fixed to the forward end of the rod 96, and is movable therewith. The rod 100 is connected to the rod 96 by a connecting bar 101, at the extreme forward end of the rods 100 and 96. A stud 102 is fixed to the core 86 of the valve 74 and extends outwardly from the casing thereof. An arm 104 is fixed to the free end of the stud 102 and is adapted to be engaged with the valve control arm 100. The arm 104 is formed with an elongated slot 105 therein and the rear end of the arm 100 is adapted to be slidably engaged in the slot. Collars 106 and 107 are fixed on the arm 100 on opposite sides of the arm 104, and are adapted to rock the arm 104 together with the stud 102 and the core 86 upon sliding movement of the rod 96. A collar 108 is fixed on the extreme forward end of the rod 91, and is adapted to abut the forward side of the arm 98, when the ram 60 is moved to the compressing or rear end.

Figure 11:
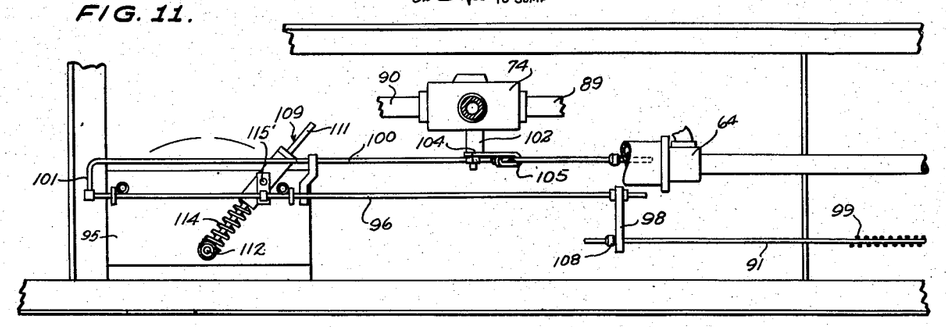
Figure 11 is a side elevation of the ram control valve and the valve actuating means, showing the valve in the ram extending position.
Figures 12, 14:
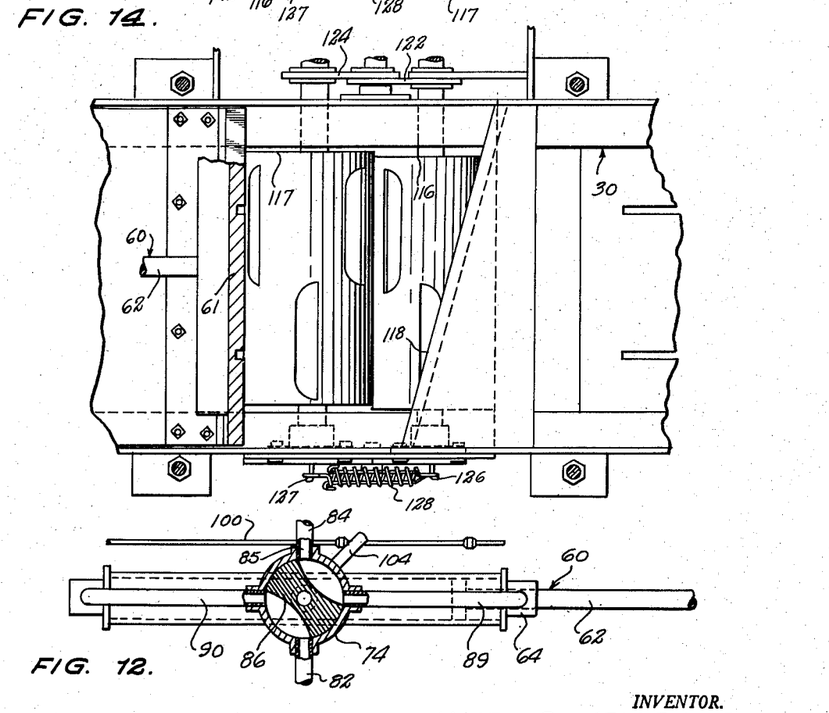
Figure 12 is a fragmentary horizontal section showing the control valve in the ram retracting position.
Figure 14 is a fragmentary longitudinal section taken on the line 14—14 of Figure 2.
Figure 13:
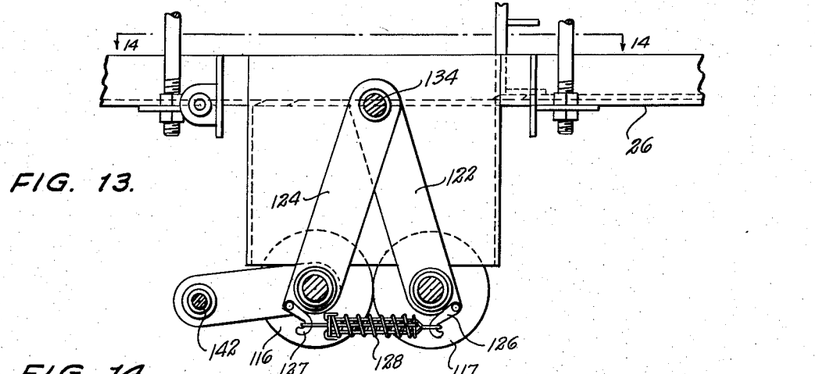
Figure 13 is a fragmentary bottom plan view of the rollers and their supporting means.

It is desired that the valve 74 should be changed from one position to the other by a snap action, and a toggle link 109 is pivoted on the plate 95 for that purpose. The toggle link 109 includes an upper member 110, slidable on a rod 111, the lower end of the rod 111 being pivoted on a pin 112 fixed on the plate 95 along the lower edge thereof. A spring 114 is engaged about the rod 111 and constantly presses the sleeve 110 upwardly. A bearing member 115 is pivoted, as at 115', on the sleeve 110, above the spring 114, and the rod 96 is fixed in the bearing 115. In one position of the valve 74, the toggle link 109 will be inclined forwardly as clearly shown in Figure 9 of the drawings, and in the other position of the valve, as shown in Figure 12 of the drawings, the toggle link 109 will be pivoted to a rearwardly inclined position as shown in Figure 11. The spring 114 on the shaft 111 will constantly press the sleeve 110 upwardly, to an extreme position as the spring 114 will be under the greatest tension when the toggle link 109 is in a vertical position, as shown in dotted lines in Figure 9.

Figure 1:
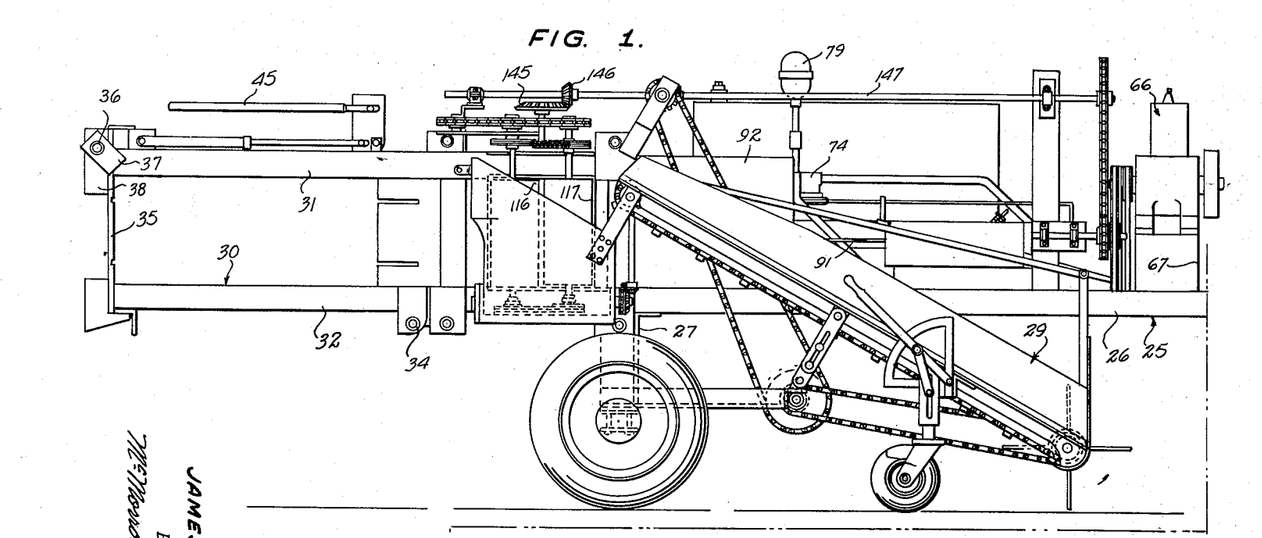
Figure 1 is a side elevation, partly broken away, of a hydraulic baler constructed according to an embodiment of my invention.
Figure 1A:
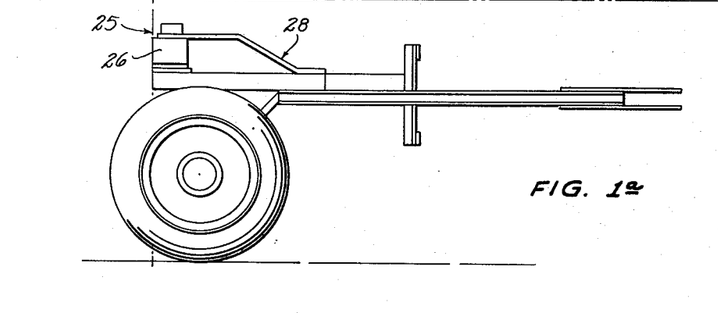
Figure 1a is a side elevation of the front end of the baler, not shown in Figure 1.
Figure 2:
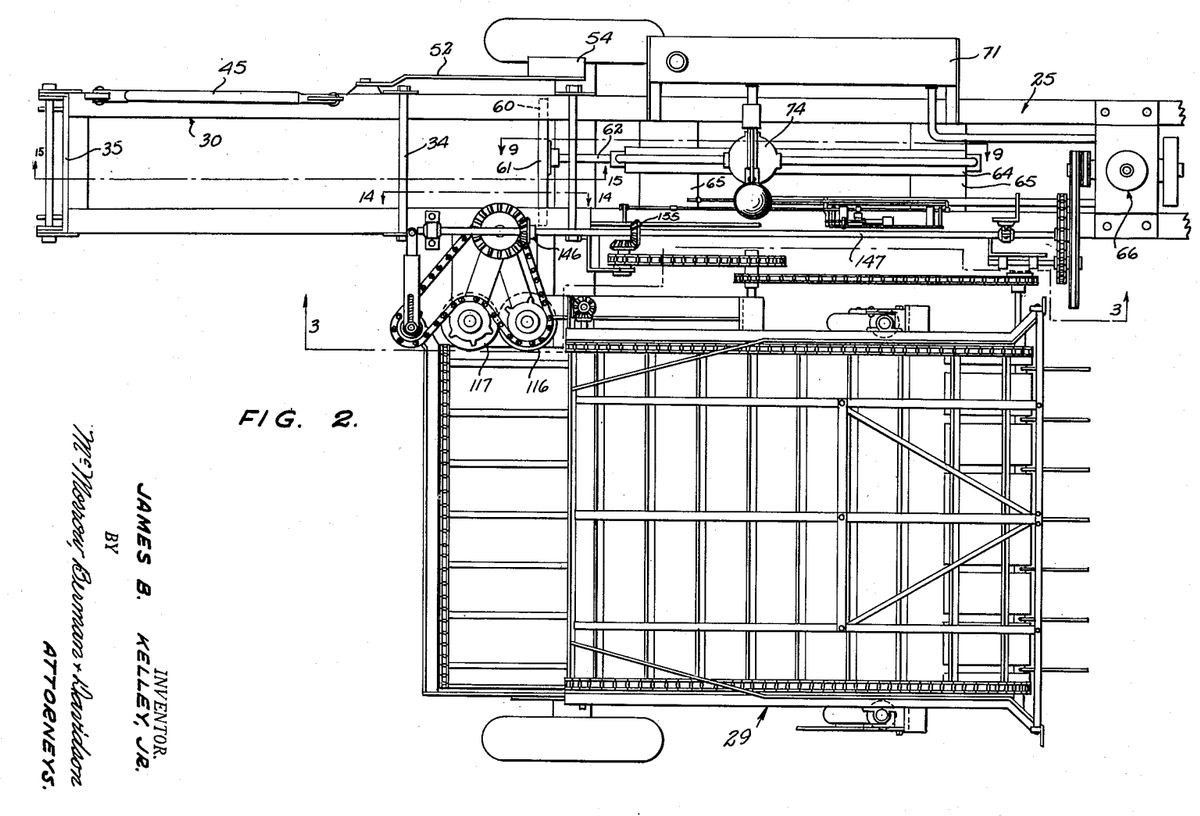
Figure 2 is a top plan view of the baler.
Figure 3:
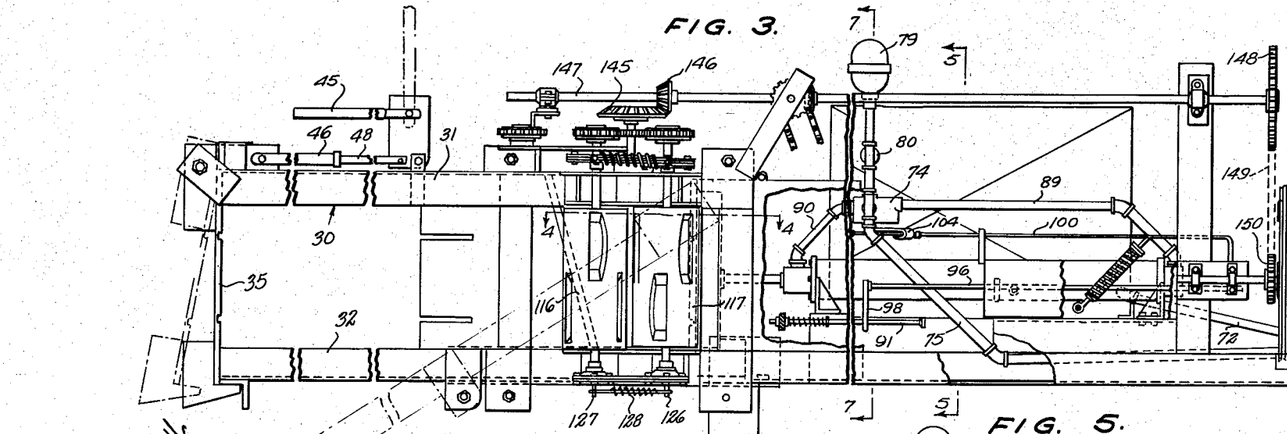
Figure 3 is a longitudinal section taken on the line 3—3 of Figure 2.
Figure 4:
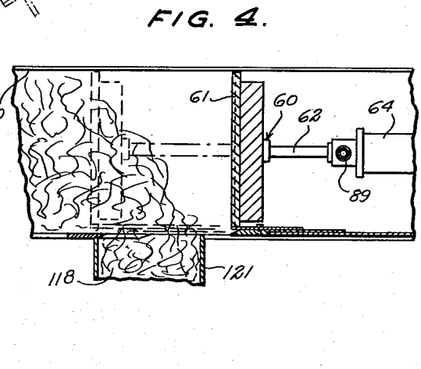
Figure 4 is a fragmentary horizontal section, taken on the line 4—4 of Figure 3.
Figure 5:
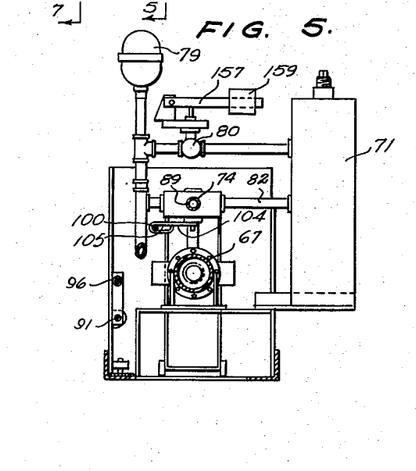
Figure 5 is a transverse section, taken on the line 5—5 of Figure 3.
Figure 6:
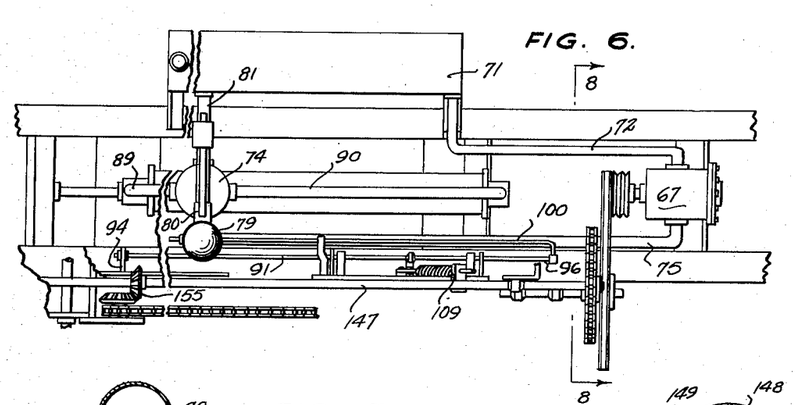
Figure 6 is a top plan view, partly broken away, of the hydraulic ram and operating means.
Figure 7:
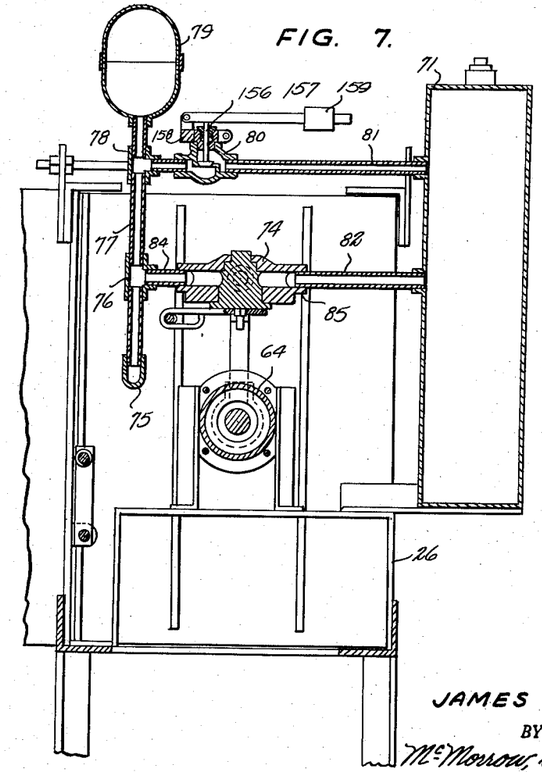
Figure 7 is a transverse section taken on the line 7—7 of Figure 3.
Figure 8:
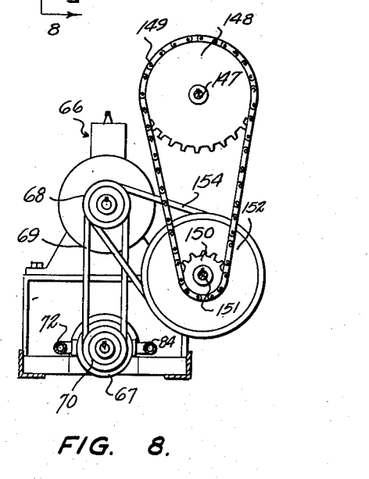
Figure 8 is a transverse section taken on the line 8—8 of Figure 6.

In the operation of the valve control mechanism, when the ram 60 is moved forwardly, to the right in Figure 1, the spring 99 will be compressed against the arm 98 and further movement of the ram will move the arm 96 rearwardly, or the left, in the bearings 97. Forward movement of the rod 96 will also carry the rod 100 forwardly and the collar 107 will bear against the arm 104 for rotating the valve core 86 from the position shown in Figure 12, to the position shown in Figure 10. With the valve in the position shown in Figure 10, the fluid under pressure will be admitted to the forward end of the cylinder 64 for moving the ram rearwardly in the baler. As the ram 60 approaches its most rearward position, the collar 108 on the shaft or rod 91 will engage the forward side of the arm 98 for carrying with it the arms 96 and 100. As the arms 96 and 100 are moved rearwardly with the rod 91, the rod 100 will initially slide loosely through the slot 105 of the arm 104, and when the toggle link 109 has been moved rearwardly beyond the vertical position, the rods 96 and 100 will be snapped rearwardly so that the collar 106 will engage the arm 104 for rotating the core 86 from the position shown in Figure 10, to the position shown in Figure 12. From this position the fluid is directed from the pump to the rear end of the cylinder 64 for starting the cycle of operation over.

A pair of spring pressed rollers 116 and 117 are swingably mounted on the rear end of the frame 26, in the opening of the entrance chamber 118. The entrance chamber 118 is formed by the top and bottom walls 119 and 120 and side walls 121 which are connected to the frame 26 at the forward end of the forming chamber 30. The rollers 116 and 117 are adapted to press the hay or other material from the horizontal conveyor of the pickup 29 into the compression or forming chamber 30. The rollers 116 and 117 are rotatably mounted on a pair of arms 122 and 124, respectively, which links or arms are pivoted on a common stub shaft 134 on one of the longitudinal members of the frame 26. Similar arms 122 and 124 connect the upper end of the rollers 116 and 117 to the longitudinal member of the frame 26 in the same manner. The rollers are formed with outwardly opening pockets 125 therein for engagement with the straw or hay to be forced through the entrance chamber. Hooks 126 and 127 are formed on the outer ends of the links 116 and 117, respectively, and a spring 128 is fixed between the hooks for urging the arms 116 and 117 together at their outer ends. The spring 128 therefore continually presses the rollers 116 and 117 together for compacting the straw or other material as it is passed into the forming chamber. A sprocket 129 is fixed on the upper end of the roller 116, and a sprocket 130 is fixed on the upper end of the roller 117. The sprockets 129 and 130 are fixed on the axial shafts 131 and 132 respectively on which the rollers 116 and 117 are mounted.

A sprocket 135 is fixed on the stub shaft 134. A link chain 136 engages about the sprockets 135, 129 and 130. The chain 136 also engages about a sprocket 137 which is mounted for keeping the chain 136 at a constant tension.

A telescopic rod 138 is pivoted at one end on the frame 26 for supporting the sprocket 137. The telescopic rod 138 includes an inner rod 139 which is pivoted at the inner end by a pivot pin 143 onto the upper frame member of the frame 26. A tubular member 140 is slidable on the rod 139, and is formed with an elongated slot 141 on the upper and lower side thereof. The axle 142 of the sprocket 137 is engaged through the slots 141, and is constantly pressed outwardly by a spring 144 disposed within the tubular member 140. The sprocket 137 and the telescopic rod 138 act as a chain tightener for keeping the chain 136 at a constant tension while in engagement with the sprockets 130, 129 and the sprocket 135.

A beveled gear 145 is fixed on the shaft 134, on which the driving sprocket 135 is fixed. A second beveled gear 146 engages the periphery of the beveled gear 145, for driving the rollers 116 and 117. The beveled gear 146 is fixed on a drive shaft 147 which extends along the length of the baler 25 and is operatively connected with the motor 66, to be driven thereby. A gear 148 is fixed on the forward end of the drive shaft 147, and a chain 149 is trained about the gear 148 and a lower spur gear 150. The gear 150 is rotatable on a shaft 151 supported adjacent the drive shaft of the motor 66. A pulley 152 is also fixed on the shaft 151, and a belt 154 is trained about the pulley 152 and a second pulley on the drive shaft of the motor, whereby the drive shaft 147 is operatively driven by the motor 66.

A second beveled gear 155 is fixed on the drive shaft 147, intermediate the length thereof and forwardly of the beveled gear 146 to provide a driving connection for the conveyors of the pickup mechanism 29 associated with the baler 25.

In the use and operation of the baler 25, described above, the motor 66 drives the pump 67 for providing fluid under pressure for actuating the ram 60. While the motor is running and the fluid being continually supplied to the valve 74, the ram will be continually reciprocated in the frame 26 and in the forming chamvber 30 for packing the material therein. While the ram is reciprocating in the forward end of the forming chamber, the rollers 116 and 117 are rotating and continually feeding the material from the horizontal conveyor of the pickup member 29 into the entrance chamber 121 and then into the forming chamber. The ram will continue reciprocating until the material is considerably well packed in the forming chamber and the material exerts an increasing resisting force against the movement of the ram. When the resistance of the material in the forming chamber has reached a determined value, the fluid, under the increased pressure will force open the pre-set pressure relief valve 80 to stop the reciprocation of the ram.

The pressure relief valve 80 has a vertically extending poppet valve 156 for closing the transverse opening therein. An arm 157 is pivoted on a bracket 158, which in turn is clamped about the valve body 80. A weight 159 is slidable along the length of the arm 157 and will continually bias the outer end of the arm 157 downwardly. As the valve stem 156 engages the arm 157 adjacent the pivot thereof the moment arm of the weight 159 will determine the pressure at which the valve 80 will release for discharging the fluid into the tank 71, when the ram 60 has ceased its movement.

The weight 159 may be positioned on the arm 157, at the will of the operator and will determine the size and compactness of the bales formed in the forming chamber. Once the weight 159 has been set, and the machine set in operation, all of the bales formed in the forming chamber 30 will be formed with a uniform size and weight.

When the bale has been formed in the forming chamber 30, the operator may raise the arm 45 for releasing the locking member 40, and the force of the ram on the bale will press the gate or rear wall 35 outwardly so that the latch 39 will become disengaged with the outer end of the bottom wall 32, and the weight of the bale will press the bottom wall 32 downwardly about the hinge 34. With the bottom wall 32 inclined downwardly and rearwardly, the bale will be removed from the forming chamber upon the forward movement of the baler.

I do not mean to confine myself to the exact details of construction herein disclosed, but claim all variations falling within the purview of the appended claims.

I claim:

1. In a hay baler, a first longitudinally extending main frame, a horizontally disposed bottom frame arranged longitudinally of said first frame adjacent one end of the latter and connected at one end to said main frame for rocking movement from a horizontal position to a position at an angle with respect to said horizontal position, a second horizontally disposed top frame positioned in superimposed longitudinal spaced relation with respect to said bottom frame and having one end fixedly secured to said main frame, a vertically disposed plate arranged transversely of said bottom and top frames adjacent the other ends thereof and having its upper end connected to said top frame adjacent the other end thereof for swinging movement into and out of engagement with the other end of said bottom frame, an upstanding abutment fixedly projecting from the upper end of said plate, said plate together with said bottom and top frames forming a longitudinally extending chamber for receiving hay to be compacted into a bale, interengaging means on the lower end of said plate and the other end of said bottom frame for releasably holding said bottom frame in its horizontal position, a bolt on said top frame adjacent the other end normally engageable with said abutment and mounted for longitudinal movement toward and away from said abutment, hand actuable means operatively connected to said bolt for effecting the longitudinal movement of said bolt toward said abutment to thereby retain said base frame in its horizontal position, feeding means arranged transversely of said main frame inwardly of said one end thereof and in communication with said baling chamber intermediate said one end thereof for introducing hay to be compressed and baled into said chamber, a ram positioned longitudinally of said main frame adjacent said one end of the latter and mounted on said frame for longitudinal reciprocating movement into and out of said one end of said baling chamber for compressing and pushing the compressed hay toward said plate, and means operatively connected to said ram for effecting the reciprocatory movement of the latter.

2. In a hay baler, a first longitudinally extending main frame, a horizontally disposed bottom frame arranged longitudinally of said first frame adjacent one end of the latter and connected at one end to said main frame for rocking movement on a horizontal axis from a horizontal position to a position at an angle with respect to said horizontal position, a second horizontally disposed top frame positioned in superimposed longitudinal spaced relation with respect to said bottom frame and having one end fixedly secured to said main frame, a vertically disposed plate arranged transversely of said bottom and top frames adjacent the other ends thereof and having its upper end connected to said top frame adjacent the other end thereof for swinging movement about a horizontal axis into and out of engagement with the other end of said bottom frame, an upstanding abutment fixedly projecting from the upper end of said plate, said plate together with said bottom and top frames forming a longitudinally extending chamber for receiving hay to be compacted into a bale, interengaging means on the lower end of said plate and the other end of said bottom frame for releasably holding said bottom frame in its horizontal position, a bolt on said top frame adjacent the other end normally engageable with said abutment and mounted for longitudinal movement toward and away from said abutment, hand actuable means operatively connected to said bolt for effecting the longitudinal movement of said bolt toward said abutment to thereby retain said base frame in its horizontal position, spring means operatively connected to said bolt for urging said bolt towards its normal position for engagement with said abutment, a ram positioned longitudinally of said main frame adjacent said one end of the latter and mounted on said frame for longitudinal reciprocatory movement into and out of said one end of said baling chamber for compressing and pushing the compressed hay toward said plate, and means operatively connected to said ram for effecting the reciprocatory movement of the latter.

3. In a hay baler, a first longitudinally extending main frame, a horizontally disposed bottom frame arranged longitudinally of said first frame adjacent one end of the latter and connected at one end to said main frame for rocking movement about a horizontal axis from a horizontal position to a position at an angle with respect to said horizontal position, a second horizontally disposed top frame positioned in superimposed longitudinal spaced relation with respect to said bottom frame and having one end fixedly secured to said main frame, a vertically disposed plate arranged transversely of said bottom and top frames adjacent the other ends thereof and having its upper end connected to said top frame adjacent the other end thereof for swinging movement about a horizontal axis into and out of engagement with the upper end of said bottom frame, an upstanding abutment fixedly projecting from the upper end of said plate, said plate together with said bottom and top frames forming a longitudinally extending chamber for receiving hay to be compacted into a bale, interengaging means on the lower end of said plate and the other end of said bottom frame for releasably holding said bottom frame in its longitudinal position, a bolt on said top frame adjacent the other end normally engageable with said abutment and mounted for longitudinal movement toward and away from said abutment, hand actuable means operatively connected to said bolt for effecting the longitudinal movement of said bolt toward said abutment to thereby retain said base frame in its horizontal position, an inlet arranged transversely of said chamber adjacent one end of the latter and having one end in communication with said chamber, a pair of spring-pressed rollers positioned adjacent the other end of said inlet and mounted for rotation about vertical axes for introducing hay to be compressed and baled into said inlet, a ram positioned longitudinally of said main frame adjacent said one end of the latter and mounted on said frame for longitudinal reciprocatory movement into and out of said one end of said baling chamber for compressing and pushing the compressed hay toward said plate, and means operatively connected to said ram for effecting the reciprocatory movement of the latter.

4. In a hay baler, a first longitudinally extending main frame, a horizontally disposed bottom frame arranged longitudinally of said first frame adjacent one end of the latter and connected at one end to said main frame for rocking movement about a horizontal axis from a horizontal position to a position at an angle with respect to said horizontal position, a second horizontally disposed top frame positioned in superimposed longitudinal spaced relation with respect to said bottom frame and having one end fixedly secured to said main frame, a vertically disposed plate arranged transversely of said bottom and top frames adjacent the other ends thereof and having its upper end connected to said top frame adjacent the other end thereof for swinging movement about a horizontal axis into and out of engagement with the other end of said bottom frame, an upstanding abutment fixedly projecting from the upper end of said plate, said plate together with said bottom and top frames forming a longitudinally extending chamber for receiving hay to be compacted into a bale, interengaging means on the lower end of said plate and the other end of said bottom frame for releasably holding said bottom frame in its horizontal position, a bolt on said top frame adjacent the other end normally engageable with said abutment and mounted for longitudinal movement toward and away from said abutment, hand actuable means operatively connected to said bolt for effecting the longitudinal movement of said bolt toward said abutment to thereby retain said base frame in its longitudinal position, spring means operatively connected to said bolt for urging said bolt toward its normal position of engagement with said abutment, an inlet arranged transversely of said chamber adjacent one end of the latter and having one end in communication with said chamber, a pair of spring-pressed rollers positioned adjacent the other end of said inlet and mounted for rotation about a vertical axis for introducing hay to be compressed and baled into said inlet, means operatively connected to said ram for effecting the reciprocatory movement of the latter, and means operatively connected to said last named means for selectively controlling the degree of compressive force of said ram in the execution of its reciprocatory movement into said one end of said baling chamber.

JAMES B. KELLEY, Jr.

(References on following page)

REFERENCES CITED

The following references are of record in the file of this patent:

UNITED STATES PATENTS

| Number | Name | Date |
|---|---|---|
| 716,422 | Hulscher | Dec. 23, 1902 |
| 773,325 | Hulscher | Oct. 25, 1904 |
| 840,534 | Webb | Jan. 8, 1907 |
| 893,830 | Young | July 21, 1908 |
| 1,290,203 | Houk | Jan. 7, 1919 |
| 1,371,036 | Le Force | Mar. 8, 1921 |
| 1,506,150 | Beaty | Aug. 26, 1924 |
| 1,582,468 | Heald et al. | Apr. 27, 1926 |
| 1,711,079 | Bath | Apr. 30, 1929 |
| 2,205,278 | Russell | June 18, 1940 |
| 2,396,720 | Nolt | Mar. 19, 1946 |
| 2,476,672 | Martin | July 19, 1949 |

FOREIGN PATENTS

| Number | Country | Date |
|---|---|---|
| 113,746 | Australia | Aug. 22, 1941 |
| 60,227 | Austria | July 25, 1913 |